(12) United States Patent
Sekii et al.

(10) Patent No.: US 7,374,340 B2
(45) Date of Patent: May 20, 2008

(54) FLUID DYNAMIC-PRESSURE BEARING, SPINDLE MOTOR AND RECORDING DISK DRIVING DEVICE

(75) Inventors: Yoichi Sekii, Kyoto (JP); Masato Gomyo, Kyoto (JP)

(73) Assignee: Nidec Corporation, Kyoto (JP)

( * ) Notice: Subject to any disclaimer, the term of this patent is extended or adjusted under 35 U.S.C. 154(b) by 314 days.

(21) Appl. No.: 11/163,432

(22) Filed: Oct. 19, 2005

(65) Prior Publication Data

US 2006/0083450 A1    Apr. 20, 2006

(30) Foreign Application Priority Data

Oct. 19, 2004  (JP)  ............... 2004-303977

(51) Int. Cl.
 *F16C 32/06* (2006.01)
 *F16C 33/72* (2006.01)
(52) U.S. Cl. .................. 384/100; 384/107; 384/112
(58) Field of Classification Search ............. 384/100, 384/107, 112–113, 119–124, 132–133; 310/90, 310/90.5; 360/98.07, 99.08, 98.08
 See application file for complete search history.

(56) References Cited

U.S. PATENT DOCUMENTS

| | | | |
|---|---|---|---|
| 5,667,308 A | 9/1997 | Nose et al. | |
| 6,020,664 A * | 2/2000 | Liu et al. | 384/100 |
| 6,456,458 B1 * | 9/2002 | Ichiyama | 360/99.08 |
| 6,469,866 B1 * | 10/2002 | Nii et al. | 360/99.08 |
| 6,817,766 B2 * | 11/2004 | Gomyo | 384/100 |
| 6,834,996 B2 * | 12/2004 | Gomyo et al. | 384/100 |
| 7,021,829 B2 * | 4/2006 | Tamaoka | 384/112 |
| 7,059,771 B2 * | 6/2006 | Gomyo et al. | 384/100 |
| 2001/0022869 A1 * | 9/2001 | Tanaka et al. | 384/100 |
| 2004/0008912 A1 * | 1/2004 | Gomyo et al. | 384/100 |
| 2004/0013331 A1 | 1/2004 | Gomyo et al. | |
| 2004/0190802 A1 * | 9/2004 | Gomyo et al. | 384/100 |

FOREIGN PATENT DOCUMENTS

| | | | |
|---|---|---|---|
| JP | H10-080091 A | | 3/1998 |
| JP | 2966725 B2 | | 8/1999 |
| JP | 3013969 B2 | | 12/1999 |
| JP | 2001025208 A | * | 1/2001 |
| JP | 2002238228 A | * | 8/2002 |
| JP | 2003-184867 A | | 7/2003 |
| JP | 2003244886 A | * | 8/2003 |
| JP | 2003319602 A | * | 11/2003 |
| JP | 2004-044789 A | | 2/2004 |

* cited by examiner

*Primary Examiner*—Marcus Charles
(74) *Attorney, Agent, or Firm*—Volentine & Whitt, PLLC

(57) ABSTRACT

A fluid dynamic-pressure bearing includes a thrust dynamic-pressure bearing between a bearing member and a rotor hub and a tapered sealing portion continuous with the thrust dynamic-pressure bearing and defining a radial gap whose width gradually increases in the axial direction. A neck is formed in a passageway between the thrust dynamic-pressure bearing and a lubricating fluid/air interface maintained in the tapered sealing portion for increasing flow resistance of the lubricating fluid.

20 Claims, 6 Drawing Sheets

FLUID DYNAMIC-PRESSURE BEARING, SPINDLE MOTOR AND RECORDING DISK DRIVING DEVICE

BACKGROUND OF THE INVENTION

1. Field of the Invention

The present invention relates to a fluid dynamic-pressure bearing, a spindle motor including the fluid dynamic-pressure bearing and a recording disk driving device including the spindle motor.

2. Background Art

In recent years, spindle motors have been required to have a stable deflection characteristic against vibrations, impacts and the like, since they are required to perform reading and writing from and onto a disk, even in the event that vibrations, impacts and the like are imposed on the spindle motor.

For example, as illustrated in FIG. 6, a thrust dynamic-pressure bearing 4 is formed between the axially upper end surface of a bearing member 1 and the lower surface of a rotor hub 2. A taper sealing portion 6 for preventing the leakage of lubricating fluid to the outside is formed below the thrust dynamic-pressure bearing 4 in the axial direction. The lubricating fluid is retained continuously from the thrust dynamic-pressure bearing 4 to the taper sealing portion 6. A lubricating-fluid flow channel 8 is defined by a flange portion 1a of the bearing member 1 and an annular member 10 mounted to the rotor hub 2 such that it has a substantially L-shaped cross-sectional area. Further, the gaps other tan the bearing gap are defined to have greater dimensions than that of the bearing gap, in order to prevent increases of the torque loss.

However, with the configuration having the thrust dynamic-pressure bearing 4 formed between the upper end surface of the bearing member 1 and the lower surface of the rotor hub 2, a large amount of lubricating fluid is retained in the thrust dynamic-pressure bearing 4 during the rotation of the rotor hub 2, since the thrust dynamic-pressure bearing 4 has a large diameter. Accordingly, if an external force is exerted thereon from outside of the motor, this will cause a large amount of lubricating fluid to move within a short time.

As a result, a large amount of lubricating fluid will move to the taper sealing portion 6 located below the thrust dynamic-pressure bearing 4 in the axial direction, which will make it impossible to retain all the lubricating fluid with the taper sealing portion 6, thereby resulting in leakage of lubricating fluid to the outside of the taper sealing portion 6.

In order to cope therewith, it is possible to increase the gap dimension of the taper sealing portion 6 for enabling the retaining of a larger amount of lubricating fluid. However, there is a limit to the volume of lubricating fluid which can be retained by the taper sealing portion 6.

BRIEF SUMMARY OF THE INVENTION

The present invention can improve the fluid retaining function of the taper sealing portion with a simple configuration.

The present invention provides a fluid dynamic-pressure bearing, a spindle motor and a recording disk driving device having excellent durability and reliability.

A fluid dynamic-pressure bearing as an example of the present invention includes a stationary assembly, a rotational assembly which rotates about a center axis with respect to the stationary assembly, and a lubricating fluid retained between the stationary assembly and the rotational assembly.

A fluid dynamic-pressure bering is formed between the stationary assembly and the rotational assembly, and includes dynamic pressure-generating grooves for inducing dynamic pressures in the lubricating fluid A single annular interface formed between the lubricating fluid and the air is located within a taper sealing portion whose radial gap dimension gradually increases in the axial direction from the lubricating fluid to the air, and the lubricating fluid is retained continuously from the taper sealing portion to at least the fluid dynamic-pressure bearing.

A squeeze portion is formed between the fluid dynamic-pressure bearing and the single annular interface, the squeeze portion constricts the annular gap between a part of stationary assembly and a part of the rotational assembly which are adjacently opposed to each other in the radial direction, whereby the squeeze portion increases a flow resistance to prevent the lubricating fluid from flowing out of the fluid dynamic-pressure bearing.

With the fluid dynamic-pressure bearing according this example of the present invention, it is possible to improve the fluid retaining function of the taper sealing portion with a simple configuration. This enables elongating the lifetime of the fluid dynamic-pressure bearing and improving the reliability of the fluid dynamic-pressure bearing with low cost.

DETAILED DESCRIPTION OF THE INVENTION

Figure 1:
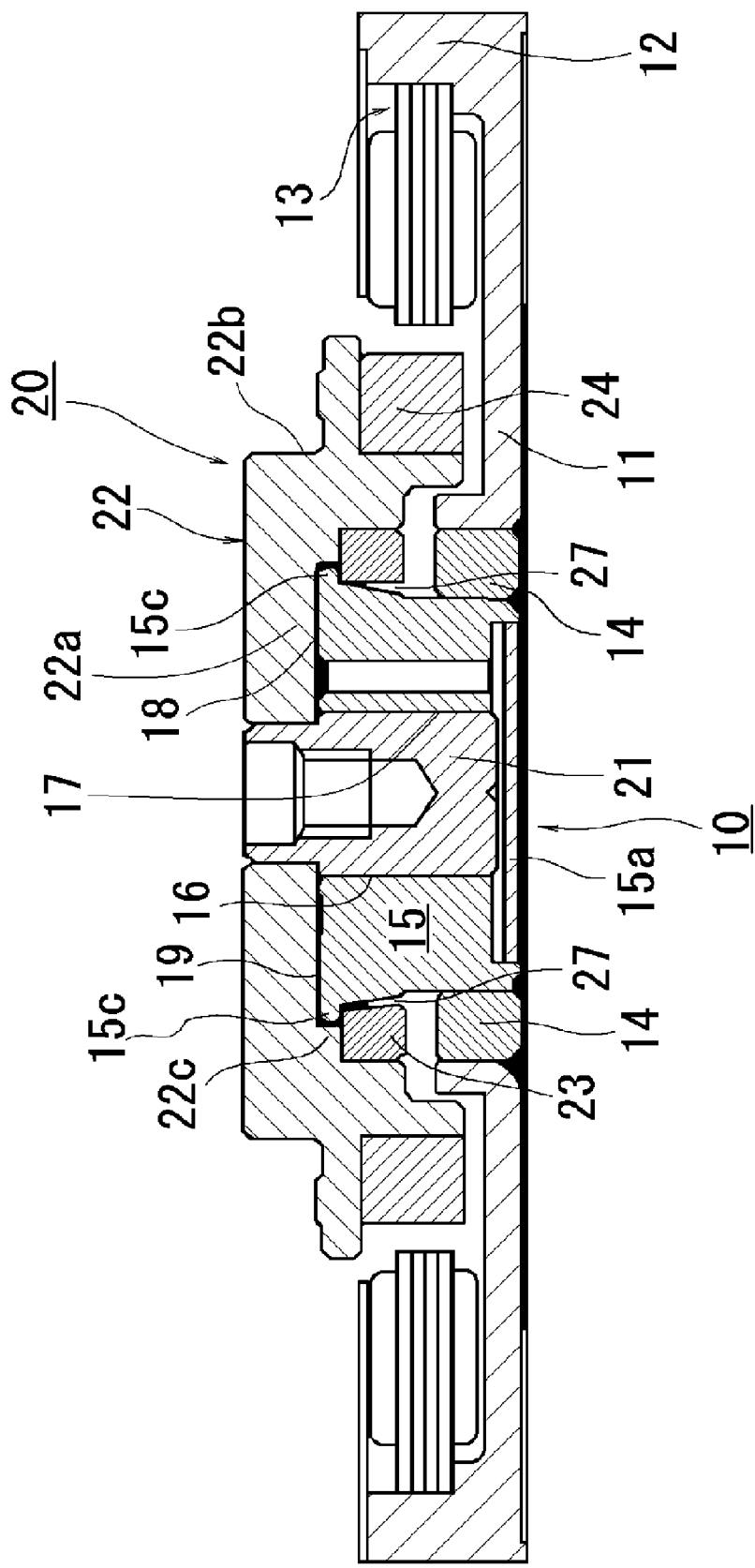
FIG. 1 is a longitudinal sectional view of a spindle motor including a fluid dynamic-pressure bearing according to a first embodiment of the present invention.

With reference to FIG. 1 to FIG. 5, embodiments of the present invention will be described. In the description of the present invention, positional terms such as "upper", "lower", "right" and "left" will merely designate positions and orientations only in the drawings and will not designate actual positions and orientations in actual configurations.

First Embodiment

A spindle motor illustrated in FIG. 1 includes a stationary assembly 10 and a rotor assembly 20.

Figure 5:
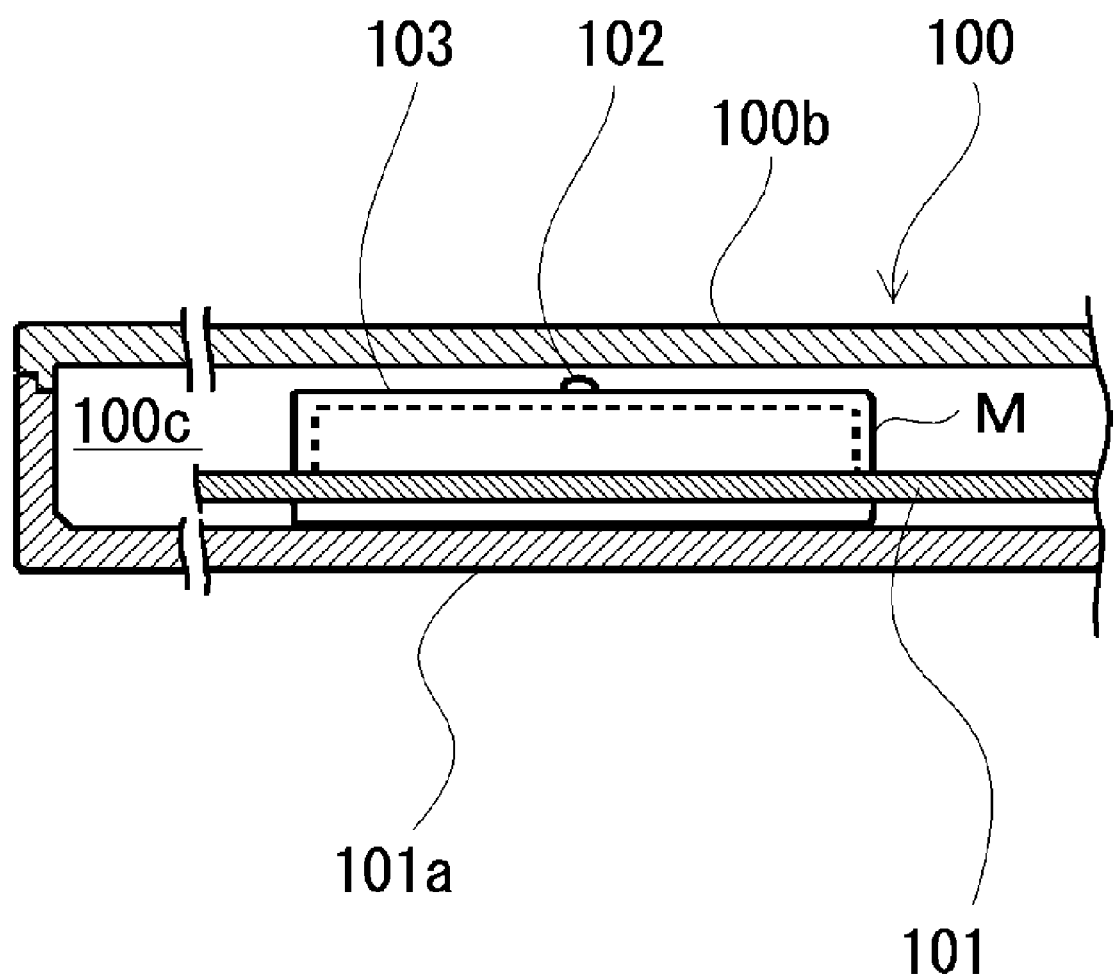
FIG. 5 is a longitudinal sectional view illustrating an exemplary schematic configuration of a recording disk driving device including the spindle motor in FIG. 1.
Figure 6:
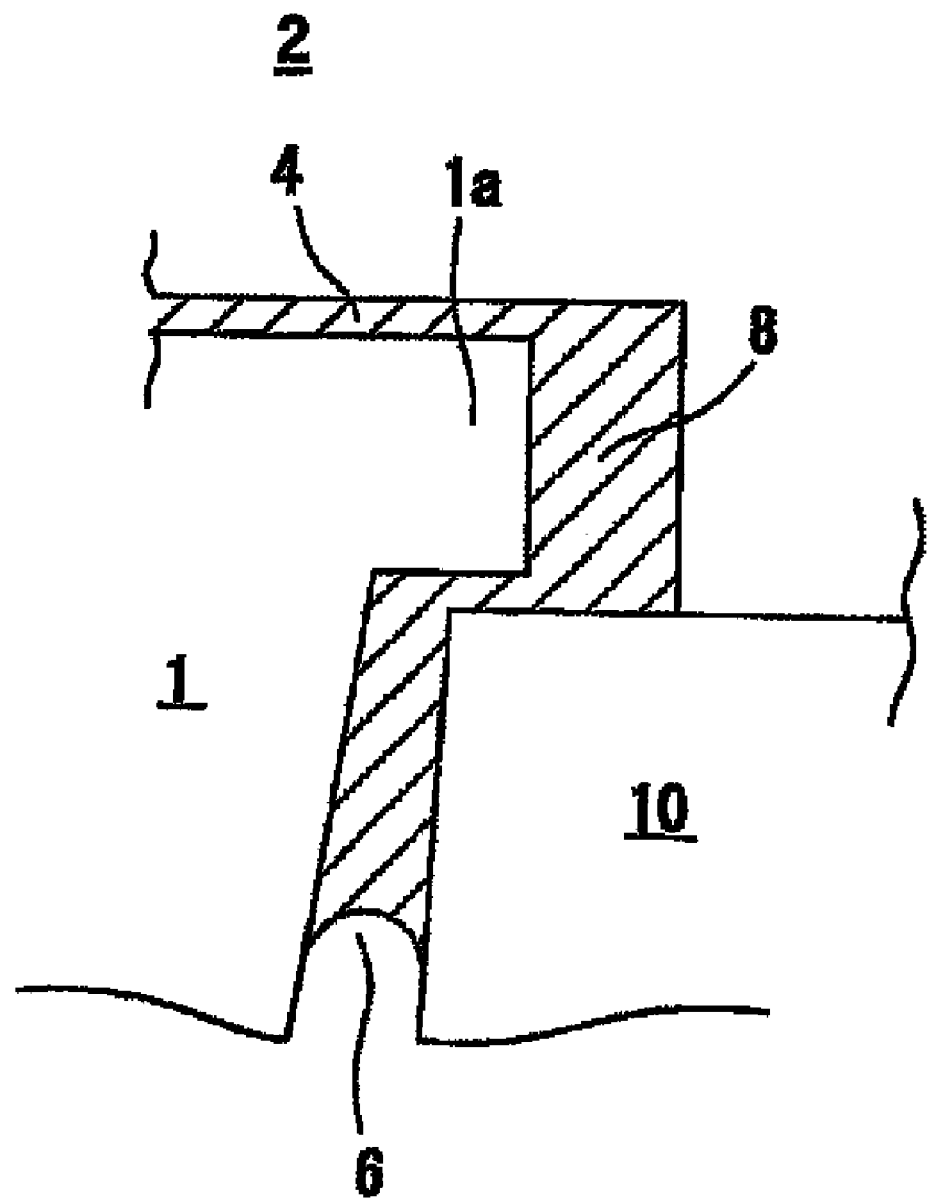
FIG. 6 is a partially-enlarged cross-sectional view illustrating the portion around the taper sealing portion of a conventional fluid dynamic-pressure bearing.

The stationary assembly 10 includes a base frame 11 forming at least a portion of a housing 100 as illustrated in FIG. 5. A stator 13 is retained on the inner peripheral wall surface of a core retaining portion 12 which extends annularly at the outermost peripheral portion of the base frame 1.

A ring-shaped sleeve retaining portion 14 is mounted on the substantially central portion of the base frame 11 and a substantially-hollow cylindrical bearing member 15 is retained in the inner peripheral portion of the ring-shaped sleeve retaining portion 14 through press fitting or bonding. In the present embodiment the bearing member 15 is made of a stainless steel (SUS301, SUS302, SUS303, SUS304, SUS420, SUS430 etc.). However, the bearing member 15 is not limited to being made of stainless steel and may be made of a copper-based material such as phosphor bronze having excellent workability.

A shaft 21 forming a portion of the rotor assembly 20 is rotatably inserted in the inner peripheral portion of the bearing member 15. In the present embodiment, the shaft 21 is made of a stainless steel (SUS301, SUS302, SUS303, SUS304, SUS420, SUS430, etc.). However, the shaft 21 is not limited thereto. Further, a radial dynamic-pressure bearing 17 is formed at a fourth gap 16 between an outer peripheral surface of the shaft 21 and an inner peripheral surface of the bearing member 15.

The radial gap dimension of the radial dynamic-pressure bearing 17 is about 10 micrometers or less. Within the fourth gap 16 of the radial dynamic-pressure bearing 17, there is retained a lubricating fluid such as an ester-based lubricating oil or poly-alpha-olefin based lubricating oil. Further, the bearing member 15 is sealed at its lower end portion with a cover 15a for preventing the leakage of the lubricating fluid in the radial dynamic-pressure bearing 17 to the outside.

On the inner peripheral surface of the bearing member 15, there are provided a pair of radial dynamic pressure-generating grooves (not shown) having, for example, a herring bone shape, such that they are axially spaced apart from each other, for example. During the rotation of the shaft 21, the radial dynamic pressure-generating grooves produce pumping effects to pressurize the lubricating fluid, thus generating dynamic pressures. Through the dynamic pressures, the shaft 21 is rotatably supported in a non-contact manner.

A rotor hub 22 is secured to an upper portion of the shaft 21. The rotor hub 22 includes a rotor upper wall portion 22a mounted to the upper portion of the shaft 22 and an outer peripheral wall portion 22b extending axially downwardly from the outer peripheral portion of the rotor upper wall portion 22a. A rotor magnet 24 is mounted to the outer peripheral portion of the outer peripheral wall portion 22b such that it faces the stator 13.

When the rotor hub is made of a non-magnetic aluminum-based metal or the like, the rotor magnet 24 is mounted to the rotor hub through a yoke made of a ferromagnetic material.

Figure 2:
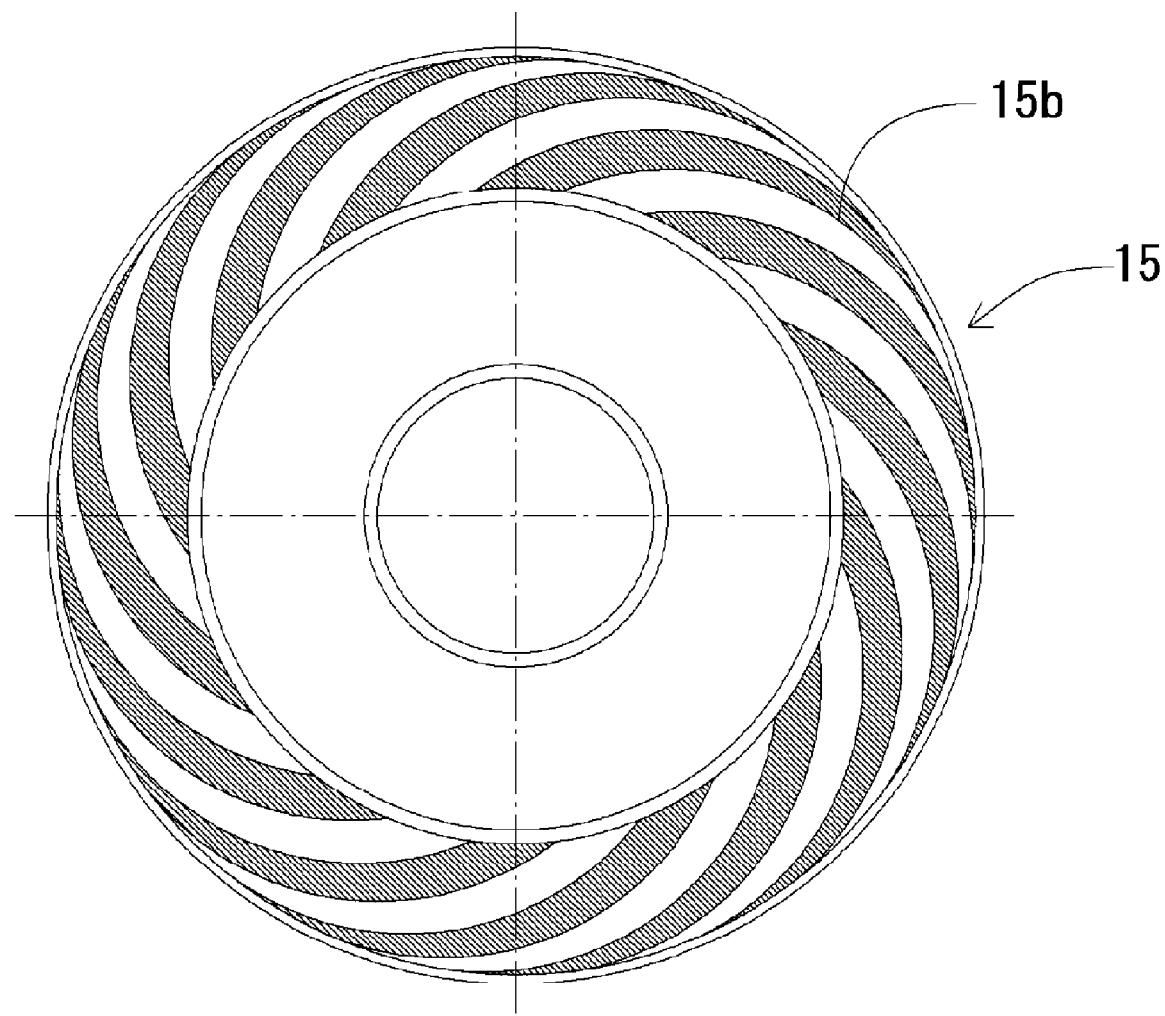
FIG. 2 is a top view of a sleeve 15 in the spindle motor in FIG. 1.

A thrust dynamic-pressure bearing 19 is formed at a first gap 18 between a lower surface of the rotor upper wall portion 22a and an upper end surface of the bearing member 15. As illustrated in FIG. 2, on the upper end surface of the bearing member 15, there are formed spirally-shaped thrust dynamic pressure generating grooves 15b. During the rotation of the rotor hub 22, the thrust dynamic pressure generating grooves 15b produce pumping effects to pressurize the lubricating fluid, thus generating dynamic pressures. Through such dynamic pressures of the lubricating fluid, the rotor hub 22 is floated in the axial direction and is rotatably supported.

Figure 3:
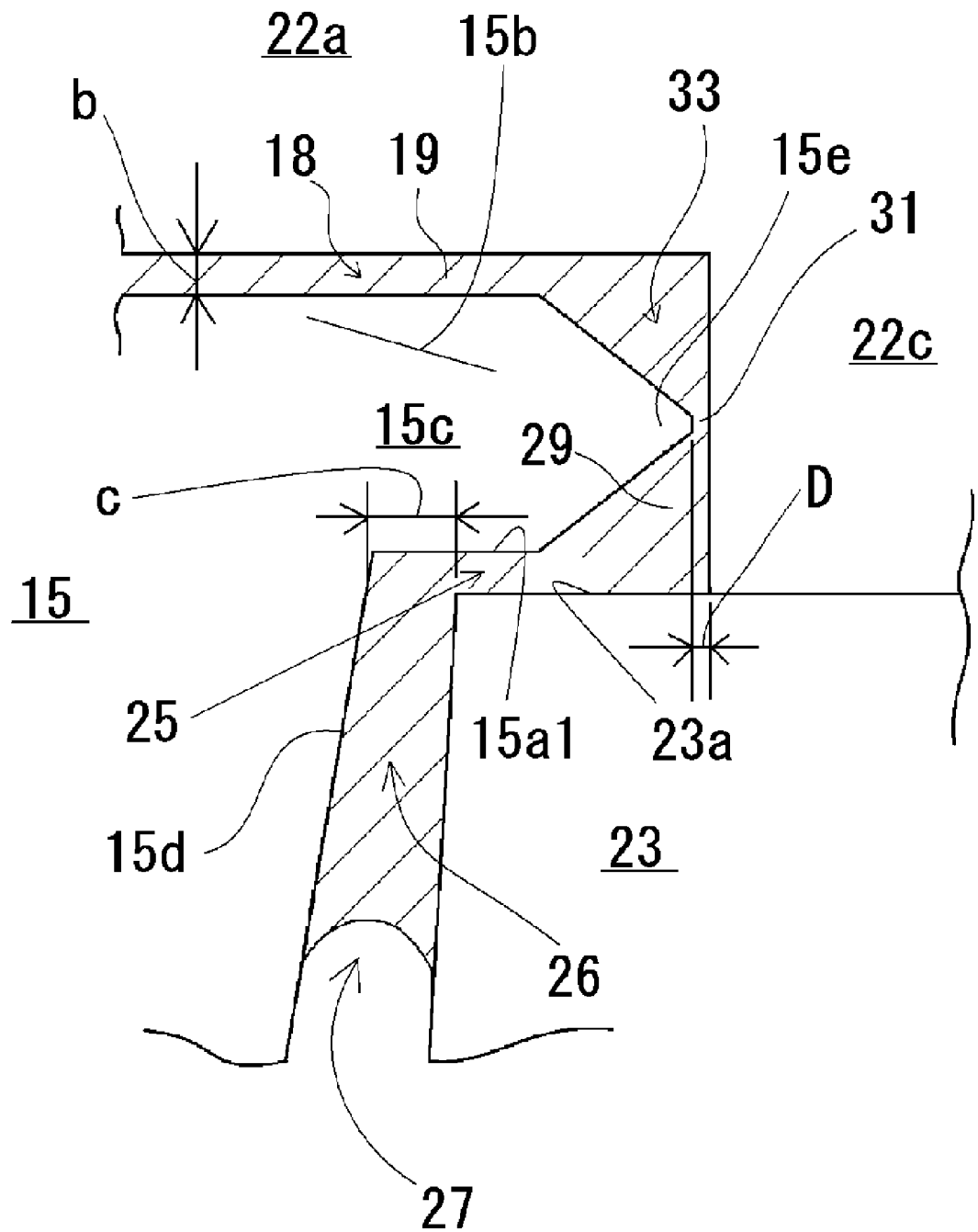
FIG. 3 is a partially-enlarged cross-sectional view illustrating the portion around a taper sealing portion of the spindle motor in FIG. 1.

As illustrated in FIG. 3, at the upper outer peripheral portion of the bearing member 15, there are formed a flange portion 15c extending outwardly in the radial direction and an inclined surface 15d which is inclined inwardly in the radial direction below the flange portion 15c. The flange portion 15c and the inclined surface 15d are disposed radially across from the rotor peripheral wall portion with a gap interposed therebetween. The rotor peripheral wall portion includes an annular wall portion 22c of the rotor hub 22 facing the flange portion 15c and an annular member 23 mounted to the annular wall portion 22c. The inner peripheral portion of the annular member 23 extends further inwardly in the radial direction than the outer peripheral portion of the flange portion 15c, and a third gap 25 is formed between the lower end surface 15a1 of the flange portion 15c and the upper end surface 23a of the annular member 23. Furthermore, during the rotation of the rotor hub 22, the upper end surface 23a of the annular member 23 engages the lower end surface 15a1 of the flange portion 15c to prevent the rotor hub 22 from being pulled out upwardly in the axial direction of the bearing member 15.

A taper sealing portion 27 is formed at a second gap 26 between the inclined surface 15d of the bearing member 15 and the inner peripheral surface of the annular member 23. The radial gap dimension of the taper sealing portion 27 gradually increases from the rotor upper wall portion 22a downwardly in the axial direction. The lubricating fluid is retained continuously within a passageway formed by the fourth gap 16, the first gap 18, the third gap 25 and the second gap 26 and a gas-liquid interface is maintained within only the taper sealing portion 27 (i.e., the second gap 26). The taper sealing portion 27 produces different capillary pressures depending on the position of the gas-liquid interface of the lubricating fluid retained in the taper sealing portion 27. Thus, in the event of reduction of the amount of lubricating fluid retained in the radial dynamic-pressure bearing 17 and the thrust dynamic-pressure bearing 19, the taper sealing portion 27 supplies the lubricating fluid to the radial dynamic-pressure bearing 17 and the thrust dynamic-pressure bering 19. Further, in the event of an increase of the volume of lubricating fluid retained in the radial dynamic-pressure bearing 17 and the thrust dynamic-pressure bearing 19 due to an increase in the temperature of the spindle motor along with the rotation of the motor, the taper sealing portion 27 accommodates the increase of lubricating fluid.

As illustrated in FIG. 3, a squeeze portion 31 is a neck in a fifth gap 29 between the outer peripheral portion of the flange portion 15cand the annular wall portion 22c and which places the first gap 18 in communication with the third gap 25. More specifically, at the outer peripheral portion of the flange portion 15c, there is formed a stationary protruding portion 15e having a substantially spire shaped cross section which extends outwardly in the radial direction. The squeeze portion 31 is formed between the stationary protruding portion 15e and the inner peripheral portion of the annular wall portion 22c.

The gap D of the squeeze portion 31 satisfies the following relationship: D<b<c, where b is the axial gap width of the thrust dynamic-pressure bearing 19 during the motor rotation and c is the radial gap width of the minimum inner-diameter portion of the taper sealing portion 27. The gap D of the squeeze portion 31 should be preferably less than 10 μm.

For example, if a large impact is imposed on the rotor hub 22 from outside during the rotation of the spindle motor, this will cause a portion of the lubricating fluid retained in the thrust dynamic-pressure bearing 19 to flow to the taper sealing portion 27. At this time, due to the aforementioned configuration of the squeeze portion 31, a squeeze action is generated in the squeeze portion 31, thus generating significant flow resistance to the lubricating fluid. Accordingly, a portion of the lubricating fluid can not easily flow toward the taper sealing portion 27 and gets retained in the upper section 33 of the fifth gap 29, i.e., near the radially outer portion of the thrust dynamic-pressure bearing 19 above the squeeze portion 31 in the axial direction.

This can prevent the leakage of lubricating fluid from the taper sealing portion 27 and also can provide a fluid dynamic-pressure bearing having excellent reliability and durability.

Also, the squeeze portion may be formed on the inner peripheral portion of the annular wall portion 22c of the rotor hub 22. Further, the squeeze portion may have an annular shape or may be formed at one or more positions.

Second Embodiment

Figure 4:
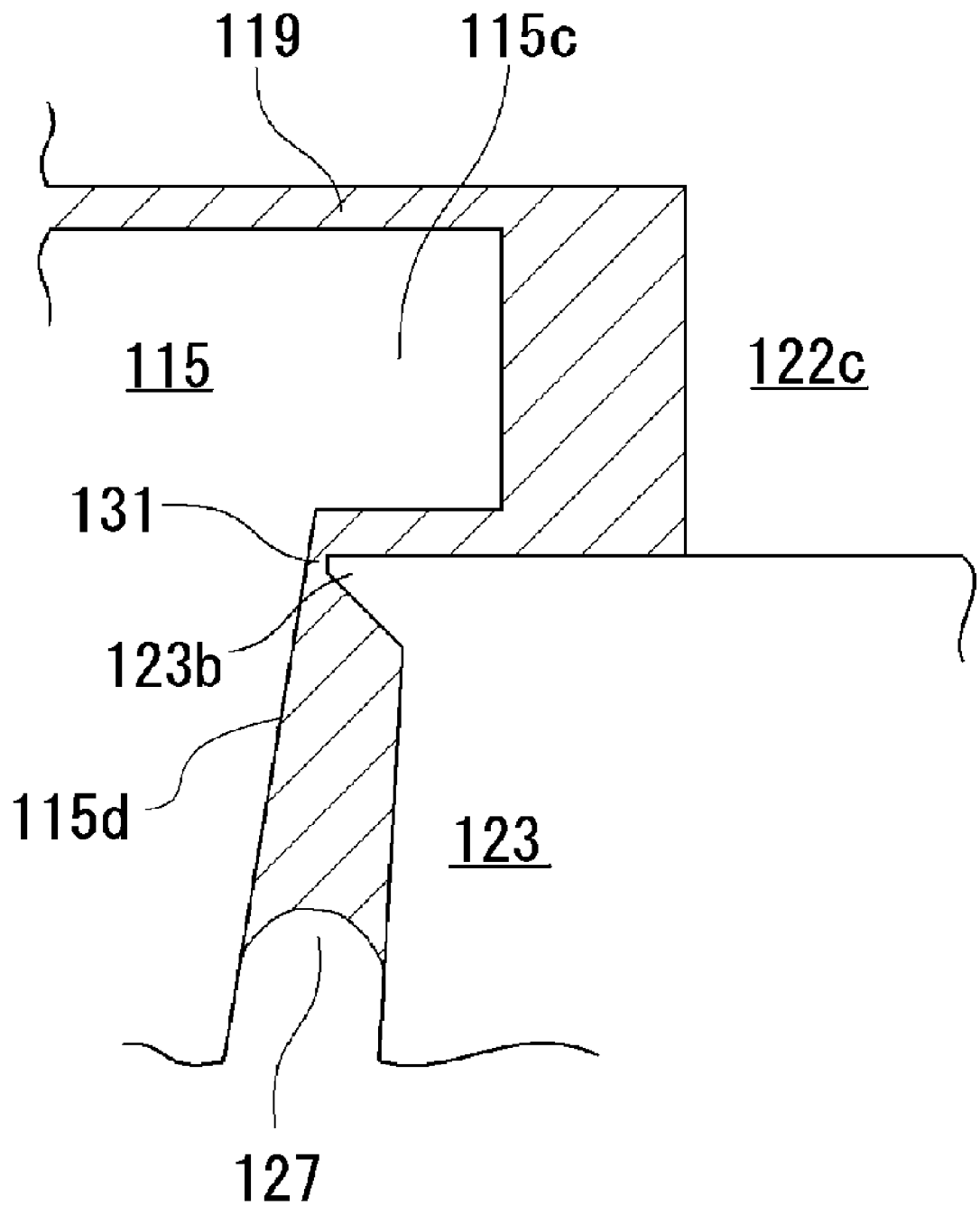
FIG. 4 is a partially-enlarged cross-sectional view illustrating the portion around the taper sealing portion according to a second embodiment of the present invention.

Next, with reference to FIG. 4, a second embodiment of the present invention will be described in detail. FIG. 4 is a main part enlarged cross-sectional view illustrating a modified embodiment of the spindle motor illustrated in FIG. 1 and FIG. 2. The spindle motor has a basic configuration similar to that of the spindle motor illustrated in FIG. 1.

As illustrated in FIG. 4, there is formed a rotational protruding portion 123b extending inwardly in the radial direction, on the inner peripheral portion of the annular member 123. A squeeze portion 131, i.e., a neck, is formed in the passageway between the rotational protruding portion 123b and the inclined surface 115d of the bearing member 115. Also in the figure, reference numeral 122c designates an annular wall portion of a rotor hub reference numeral 115c designates a flange portion of the bearing member 115, reference numeral 119 designates the lubricating fluid that is retained in the passageway formed by the gaps between the bearing member and the rotational assembly, and reference numeral 127 designates the taper sealing portion formed by the bearing member and the rotational assembly.

By forming the squeeze portion 131 according to the second embodiment, it is possible to provide the same effects as in the first embodiment.

Also, the squeeze portion may be formed on the inclined surface 115d of the bearing member 115. Further, the squeeze portion may have an annular shape or may be formed at one or more positions.

Recording Disk Driving Device

With reference to FIG. 5, there will be described a hard disk driving device (HDD) which is a recording disk driving device.

The spindle motor M according to any of the respective embodiments illustrated in FIG. 1 to FIG. 4 is secured to a first housing member 100a constituting a sealing-type housing 100. Within the housing 100 containing the spindle motor M, a clean space 100c is formed by a second housing member 100b which is fitted with the first housing member 100a. An information recording disk 101 such as a hard disk is mounted on the rotor hub of the spindle motor M (see the reference number 22 in FIG. 1). The information recording disk 101 is fixedly held by a clamp 103 which is secured to the rotor hub through a screw 102.

While there have been described fluid dynamic-pressure bearings, spindle motors and a recording disk driving device according to respective embodiments of the present hereinbefore, the present invention is not limited to these embodiments and various changes and modifications may be made without departing from the scope of the invention.

For example, while, in the aforementioned embodiments, the present invention is applied to a shaft-rotation type fluid dynamic-pressure bearing, the present invention may also be applied to a shaft-fixed type fluid dynamic-pressure bearing.

Further, while in the aforementioned embodiments the present invention is applied to a hard disk driving device (HDD), the present invention is not limited thereto and may also be applied to disk devices and other various types of motors for use with other various types of apparatuses.

Also, the bearing members according to the aforementioned embodiments may be constituted by two members, namely a sleeve and a bearing housing which holds the sleeve at its inner peripheral portion. In this case, the radial dynamic-pressure bearing 17 is formed between the inner peripheral surface of the sleeve and the outer peripheral surface of the shaft and the thrust dynamic-pressure bearing is formed between the lower surface of the rotor upper wall portion and the upper end surface of the sleeve or the upper end surface of the bearing housing. Further, the taper sealing portion is formed between the outer peripheral portion of the bearing housing and the inner peripheral portion of the annular member.

It is preferable that the squeeze portion is formed in the radial gap between the bearing member and the rotor. When the squeeze portion is formed in the axial gap between the bearing member and the rotor, it is impossible to generate sufficient squeeze actions, since the volume of the axial gap varies due to rotor floatation or impacts during rotation. By forming the squeeze portion in the radial gap between the bearing member and the rotor, it is possible to generate significant squeeze actions, since the volume of the radial gap is kept constant in the circumferential direction, even in the event that an impact is imposed on the rotor during rotation.

Japanese Patent No. 2966725 discloses a damping configuration utilizing squeeze actions. The fluid dynamic-pressure bearing includes a larger-diameter portion formed on the lower end portion of the shaft and a sleeve facing the larger-diameter portion, thus defining a narrow gap portion therebetween. With this configuration, in the event that the vibrations, impacts or the like are imposed on the shaft from outside, the lubricating fluid moves through the narrow gap portion while being subjected to larger flow resistance therefrom and, consequently, the narrow gap portion is subjected to significant squeeze actions, thus suppressing downward deflections of the shaft.

The amount of movement of lubricating fluid is determined by the product of the radial cross-sectional area of the shaft and the amount of movement of the shaft caused by the external force. The narrow gap portion is provided at a deep portion of the hollow-cylindrical-shaped sleeve and the inside portion of the sleeve is entirely filled with the lubricating fluid. Accordingly, the continuous gaps filled with the lubricating fluid are hardly affected by vibrations, impacts and the like, thus causing extremely little amounts of movement of the lubricating fluid. Further, in the fluid dynamic-pressure bearing, the sealing portion is not placed near the narrow gap portion, but formed near the opened end portion of the sleeve, which causes little changes in the fluid level within the sealing portion. Accordingly, during rotation, the sealing portion can have impact resistance substantially equivalent to that during standstill.

What is claimed is:

1. A fluid dynamic-pressure bearing comprising:
   a stationary assembly;
   a rotational assembly mounted to said stationary assembly so as to be rotatable, about a center axis of the bearing, relative to said stationary assembly,
   said rotational assembly and said stationary assembly defining a series of gaps therebetween, the gaps being open to each other so as to constitute a passageway; and lubricating fluid retained in the passageway formed by the series of gaps between said stationary assembly and said rotational assembly; wherein the gaps include a first gap delimited by and between first respective confronting surfaces of said station assembly and said rotational assembly, and at least one annular gap, comprising a second gap, delimited by and between respective peripheral surfaces of said stationary assembly and said rotational assembly, the respective peripheral surfaces confronting each other in the radial direction of the bearing, one of the first respective surfaces has dynamic pressure-generating grooves therein for inducing dynamic pressures in said lubricating fluid when the rotational assembly rotates relative to the stationary assembly about the center axis, the peripheral surfaces which delimit the second gap being oriented relative to one another such that the width of the second gap, as measured in the radial direction of the bearing, increases along the axial direction of the bearing in a direction away from the first gap, whereby said lubricating fluid is retained in the passageway between said second gap and at least said dynamic pressure-generating grooves, and an annular interface between the lubricating fluid and air is maintained within the second gap, and the passageway has a neck therein, the neck providing a constriction in the passageway between said dynamic pressure-generating grooves and said annular interface, and the neck forming part of one of the at least one annular gaps, whereby said neck increases the resistance of the lubricating fluid to flowing through said series of gaps from said dynamic pressure-generating grooves to thereby prevent said lubricating fluid from flowing out of the bearing.

2. The fluid dynamic-pressure bearing according to claim 1, wherein said first respective surfaces are end surfaces of said stationary assembly and said rotational assembly that confront each other in the axial direction of the bearing such that said first respective surfaces, said dynamic pressure-generating grooves and the lubricating fluid retained in the first gap constitute a thrust dynamic-pressure bearing.

3. The fluid dynamic-pressure bearing according to claim 1, wherein said rotational assembly includes an annular portion having an inner peripheral surface, and a protrusion projecting in the radial direction from the inner peripheral surface of the annular portion, and said neck is located between said protrusion and a portion of said stationary assembly disposed across from the protrusion in the radial direction.

4. The fluid dynamic-pressure bearing according to claim 1, wherein said stationary assembly includes a cylindrical portion, a flange extending outwardly in the radial direction of the bearing from the cylindrical portion, and a protrusion extending in the radial direction from the flange, and said is located between said protrusion and a portion of said rotational assembly disposed across from the protrusion in the radial direction.

5. The fluid dynamic-pressure bearing according to claim 1, wherein the width D of said neck, as measured in the radial direction of the bearing, satisfies the following relationship:

$D<b<c$, where b is the width of said first gap during rotation of the rotational assembly at its design speed, and c is minimum width of said second gap.

6. A spindle motor comprising said fluid dynamic-pressure bearing according to claim 1, and further comprising:
a stator fixed to said stationary assembly; and
a rotor comprising a magnet fixed to said rotational assembly.

7. A recording disk driving device comprising:
a housing;
a data storage disk onto or from which information can be written or read;
a spindle motor according to claim 6 secured to said housing and to which said disk is mounted; and
an information access unit for writing or reading information onto or from said data storage disk.

8. The spindle motor according to claim 6, wherein the width of said first gap, as measured between the first respective confronting surfaces of said stationary assembly and said rotational assembly, is smaller than the width of said neck as measure in the radial direction of the bearing.

9. The spindle motor according to claim 6, wherein the width D of said neck, as measured in the radial direction of the bering, satisfies the following relationship:

$D<b<c$, where b is the width of said first gap during rotation of the rotational assembly at a normal operating speed of the motor, and c is minimum width of said second gap.

10. A fluid dynamic-pressure bearing comprising:
a rotational assembly including a shaft, and a rotor-hub having an upper wall secured to said shaft and a peripheral wall extending axially from said upper wall;
a bearing member in which said shaft is received such that the shaft can rotate relative to said bearing member about a central longitudinal axis of the shaft, a lower surface of the upper wall of said rotor and an upper surface of said bearing member confronting each other in the axial direction of the bearing, the bearing member having dynamic pressure-generating grooves in the upper surface thereof, and said rotational assembly and said bearing member defining a series of gaps therebetween, the gaps being open to each other so as to constitute a passageway; and
lubricating fluid retained in the dynamic pressure-generating grooves and the passageway formed by the series of gaps between said bearing member and said rotational assembly, wherein
the gaps include a first gap delimited by and between the confronting upper and lower surfaces of said bering member and said rotational assembly, respectively, and at least one annular gap, comprising a second gap, delimited by and between respective peripheral surfaces of said bearing member and said rotational assembly, the respective peripheral surfaces confronting each other in the radial direction of the bearing,
the peripheral surfaces which delimit the second gap being oriented relative to one another such that the width of the second gap, as measured in the radial direction of the bearing, increases along the axial direction of the bearing in a direction away from the first gap, whereby said lubricating fluid is retained in the passageway within the first gap such that the upper and lower surfaces, the dynamic pressure-generating grooves and the lubricating fluid retained in the first gap constitute a thrust dynamic-pressure bearing, the lubricating fluid is retained between said second gap and at least said thrust dynamic-pressure bearing, and an annular interface between the lubricating fluid and air is maintained within the second gap, and the passageway has a neck therein, the neck providing a constriction in the passageway in a direction in which lubricating fluid can flow between the dynamic pressure-generating grooves of said thrust dynamic-pressure bearing and said annular interface, and the neck forming part of one of the at least one annular gaps, whereby said neck increases the resistance of the lubricating fluid to flowing through said series of gaps from said dynamic pressure-generating grooves to thereby prevent said lubricating fluid from flowing out of the bearing.

11. The fluid dynamic-pressure bearing according to claim 10, wherein said rotational assembly includes an annular portion having an inner peripheral surface, and a protrusion projecting in the radial direction from the inner peripheral surface of the annular portion, and said neck is located between said protrusion and an peripheral portion of said bearing member disposed across from the protrusion in the radial direction.

12. The fluid dynamic-pressure bearing according to claim 10, wherein said bearing member includes a protrusion extending in the radial direction from an outer peripheral portion thereof, and said neck is located between said protrusion and an inner peripheral portion of said rotational assembly disposed across from the protrusion in the radial direction.

13. The fluid dynamic-pressure bearing according to claim 10, wherein:
said bearing member includes a flange extending in the radial direction, and
said rotational assembly includes an annular member secured to the upper wall of said rotor hub, the annular member being disposed below said flange and extending inwardly of said flange in the radial direction of the bearing such that respective portions of said flange and said annular member are juxtaposed in the axial direction of the bearing,
whereby said flange and said annular member prevent said rotational assembly from being pulled out of said bearing member in the axial direction.

14. The fluid dynamic-pressure bearing according to claim 13, wherein:
said flange is disposed above said second gap in the axial direction and
said second gap is delimited by and between an outer peripheral surface of said bearing member and an inner peripheral surface of said annular member.

15. The fluid dynamic-pressure bearing according to claim 10, wherein
the width D of said neck, as measured in the radial direction of the bearing, satisfies the following relationship:

D<b<c, where b is the width of said first gap during rotation of the rotational assembly at its design speed, and c is minimum width of said second gap.

16. A spindle motor comprising said fluid dynamic-pressure bearing according to claim 10, and further comprising:
a stator fixed to said stationary assembly; and
a rotor comprising a magnet fixed to said rotational assembly.

17. A recording disk driving device comprising:
a housing;
a data storage disk onto or from which information can be written or read;
said spindle motor according to claim 16 secured to said housing and to which said data storage disk is mounted; and
an information access unit for writing or reading information onto or from said data storage disk.

18. The spindle motor according to claim 16, wherein the width of said first gap, as measured between the first respective confronting surfaces of said bearing member and said rotational assembly, is smaller than the width of said neck as measure in the radial direction of the bearing.

19. The spindle motor according to claim 16, wherein the width D of said neck, as measured in the radial direction of the bearing, satisfies the following relationship:

D<b<c, where b is the width of said first gap during rotation of the rotational assembly at a normal operating speed of the motor, and c is minimum width of said second gap.

20. The fluid dynamic-pressure bering according to claim 10, wherein:
said bearing member includes a radially extending flange disposed above said second gap,
said second gap is delimited by and between an outer peripheral surface of said bearing member, and an inner peripheral surface of said annular member,
said rotational assembly includes an annular member secured to the upper wall of said rotor hub, the annular member being disposed below said flange and extending inwardly of said flange in the radial direction of the bearing such that respective portions of said flange and said annular member are juxtaposed in the axial direction of the bearing, whereby said flange and said annular member prevent said rotational assembly from being pulled out of said bearing member in the axial direction, and
said bearing member includes a spire-shaped protrusion extending radially outwardly from said flange, and said neck is located between said protrusion an inner peripheral portion of said rotational assembly disposed across from the protrusion in the radial direction.

* * * * *